United States Patent
Vanhee et al.

(10) Patent No.: US 11,876,434 B2
(45) Date of Patent: Jan. 16, 2024

(54) AIR GAP SCAVENGING SYSTEM FOR OIL COOLED ELECTRIC MOTOR

(71) Applicant: Dana Limited, Maumee, OH (US)

(72) Inventors: Steven Vanhee, Hooglede (BE); Dolf Vandamme, Roeselare (BE)

(73) Assignee: DANA LIMITED, Maumee, OH (US)

( * ) Notice: Subject to any disclaimer, the term of this patent is extended or adjusted under 35 U.S.C. 154(b) by 202 days.

(21) Appl. No.: 17/446,933

(22) Filed: Sep. 3, 2021

(65) Prior Publication Data
US 2023/0071523 A1  Mar. 9, 2023

(51) Int. Cl.
*H02K 9/193* (2006.01)
*H02K 9/26* (2006.01)
*H02K 9/28* (2006.01)

(52) U.S. Cl.
CPC .............. *H02K 9/193* (2013.01); *H02K 9/26* (2013.01); *H02K 9/28* (2013.01)

(58) Field of Classification Search
CPC ............. H02K 9/193; H02K 9/26; H02K 9/28
See application file for complete search history.

(56) References Cited

U.S. PATENT DOCUMENTS

| | | | |
|---|---|---|---|
| 2,862,120 A | 11/1958 | Onsrud | |
| 3,009,072 A | 11/1961 | Mossay | |
| 4,909,354 A * | 3/1990 | Fluegel | F01M 11/06 184/6.12 |
| 5,859,482 A | 1/1999 | Crowell et al. | |
| 7,247,958 B2 * | 7/2007 | Iwashige | H02K 9/04 |
| 8,161,643 B2 | 4/2012 | Smith et al. | |
| 8,525,375 B2 | 9/2013 | Pal | |
| 8,686,606 B2 | 4/2014 | Jiang et al. | |
| 8,970,075 B2 | 3/2015 | Rippel et al. | |
| 9,356,492 B2 | 5/2016 | Chamberlin et al. | |
| 9,450,468 B2 | 9/2016 | Chamberlin et al. | |
| 9,893,593 B2 | 2/2018 | Sugimoto et al. | |
| 2002/0078484 A1 | 6/2002 | Ulert et al. | |
| 2004/0123980 A1 | 7/2004 | Queheillalt et al. | |
| 2008/0185924 A1 | 8/2008 | Masoudipour et al. | |
| 2009/0121562 A1 | 5/2009 | Yim | |
| 2013/0126143 A1 | 5/2013 | Sheu et al. | |
| 2013/0300229 A1 | 11/2013 | Müller et al. | |
| 2014/0117790 A1 * | 5/2014 | Sakamoto | H02K 1/02 |
| 2017/0141653 A1 | 5/2017 | Okazaki et al. | |
| 2017/0346370 A1 | 11/2017 | Sentis et al. | |

(Continued)

FOREIGN PATENT DOCUMENTS

DE  102009009819 A1  8/2010
EP  0627804 A2  12/1994

(Continued)

OTHER PUBLICATIONS

JP-2011142788-A_translate (Year: 2011).*

(Continued)

*Primary Examiner* — Tulsidas C Patel
*Assistant Examiner* — Mohammed Ahmed Qureshi
(74) *Attorney, Agent, or Firm* — McCoy Russell LLP

(57) ABSTRACT

Systems for removing excess coolant oil and air from a radial air gap between a stator and a rotor of an electric motor are provided. In one example, the systems may include a ring covering the radial air gap, the ring configured to route coolant out of the radial air gap via one or more channels.

17 Claims, 7 Drawing Sheets

(56) References Cited

U.S. PATENT DOCUMENTS

| | | | |
|---|---|---|---|
| 2019/0003572 A1 | | 1/2019 | Dellal et al. |
| 2019/0006908 A1 | * | 1/2019 | Scharlach |
| 2019/0386538 A1 | * | 12/2019 | Koerner .................. H02K 5/18 |
| 2021/0044172 A1 | | 2/2021 | Hombsch et al. |
| 2021/0083547 A1 | | 3/2021 | Vanhee |

FOREIGN PATENT DOCUMENTS

| | | | |
|---|---|---|---|
| EP | 3623636 A1 | | 3/2020 |
| JP | 2011142788 A | * | 7/2011 |
| WO | 0237648 A1 | | 5/2002 |
| WO | 2017161527 A1 | | 9/2017 |

OTHER PUBLICATIONS

Ziskovsky, D., "Electric Motor Cooling Jacket," U.S. Appl. No. 17/029,677, filed Sep. 23, 2020, 20 pages.

Ziskovsky, D. et al., "Systems and Method for an Electric Motor With Spray Ring," U.S. Appl. No. 17/138,714, filed Dec. 30, 2020, 36 pages.

Ziskovsky, D. et al., "Systems and Method for an Electric Motor With Spray Ring," U.S. Appl. No. 17/138,726, filed Dec. 30, 2020, 36 pages.

\* cited by examiner

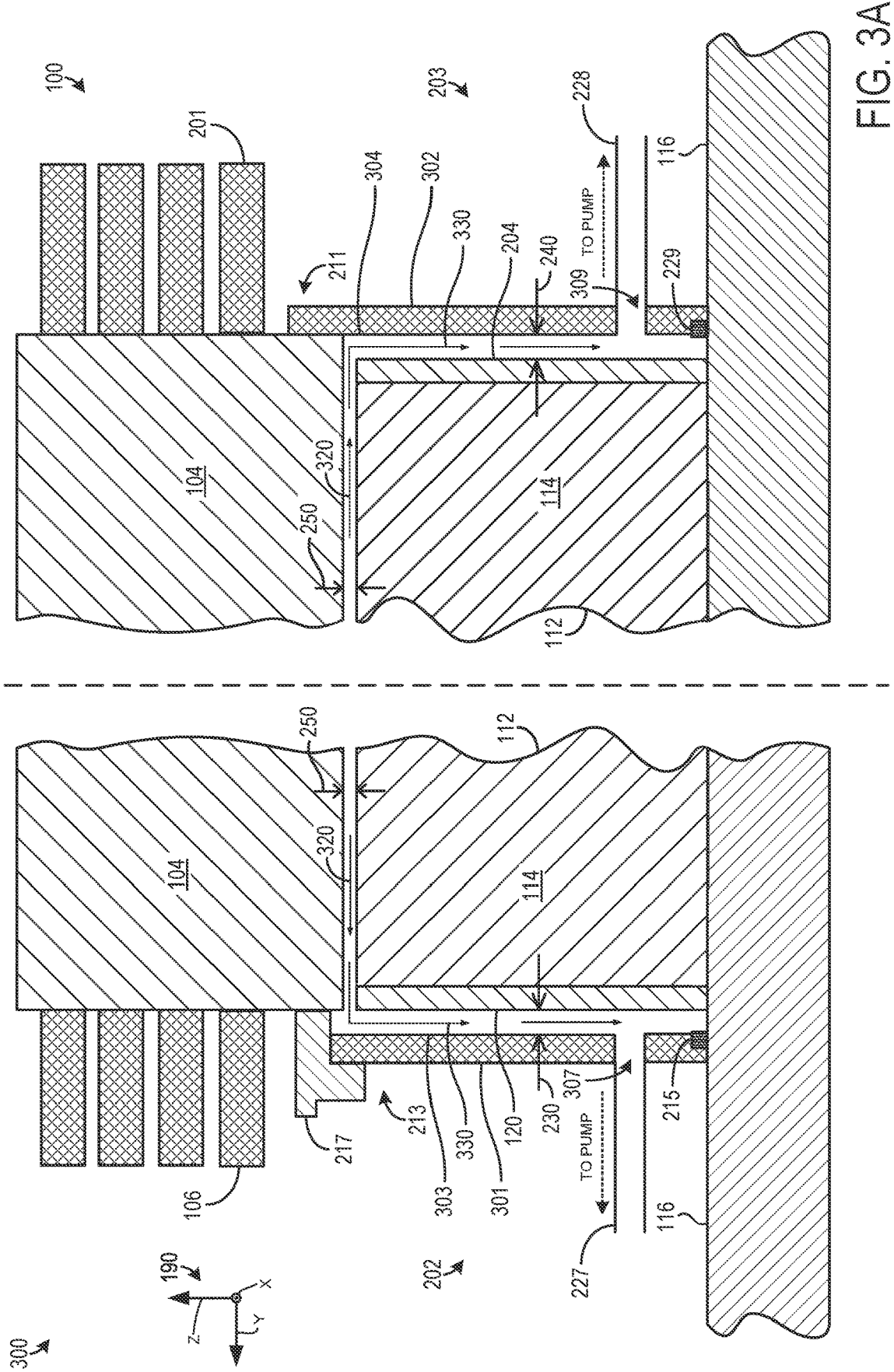

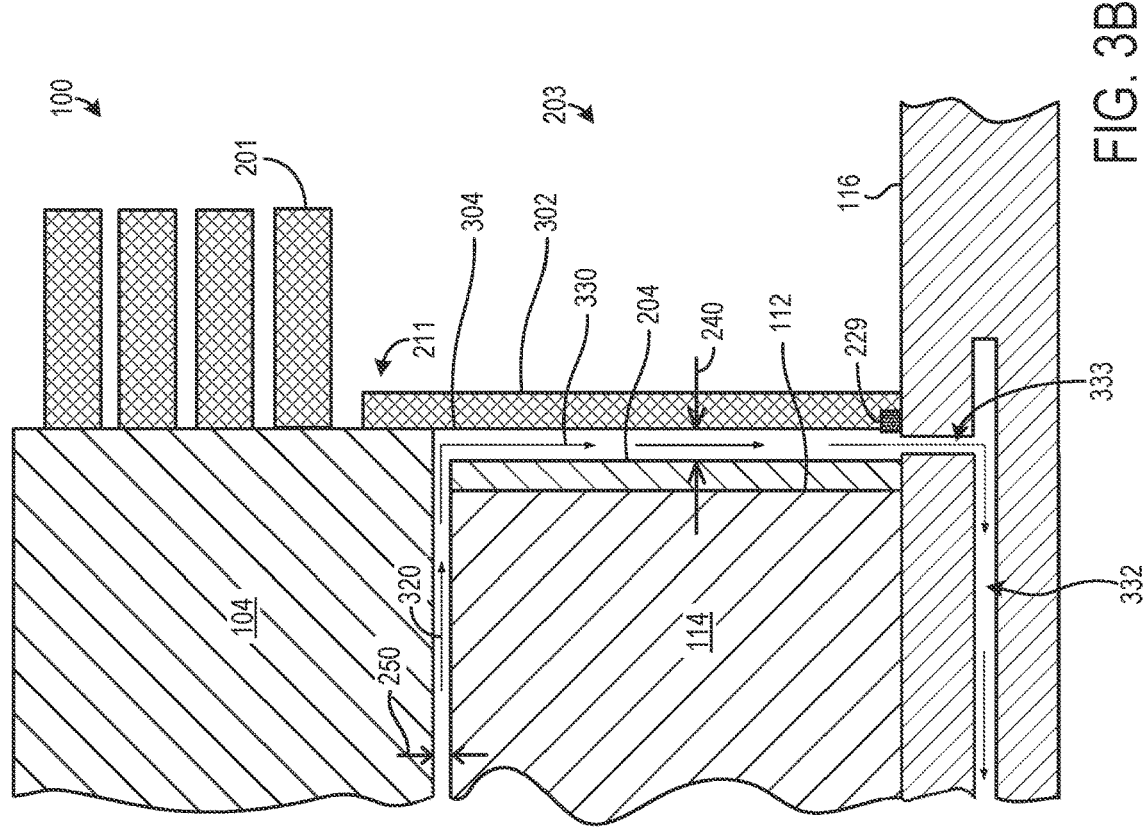
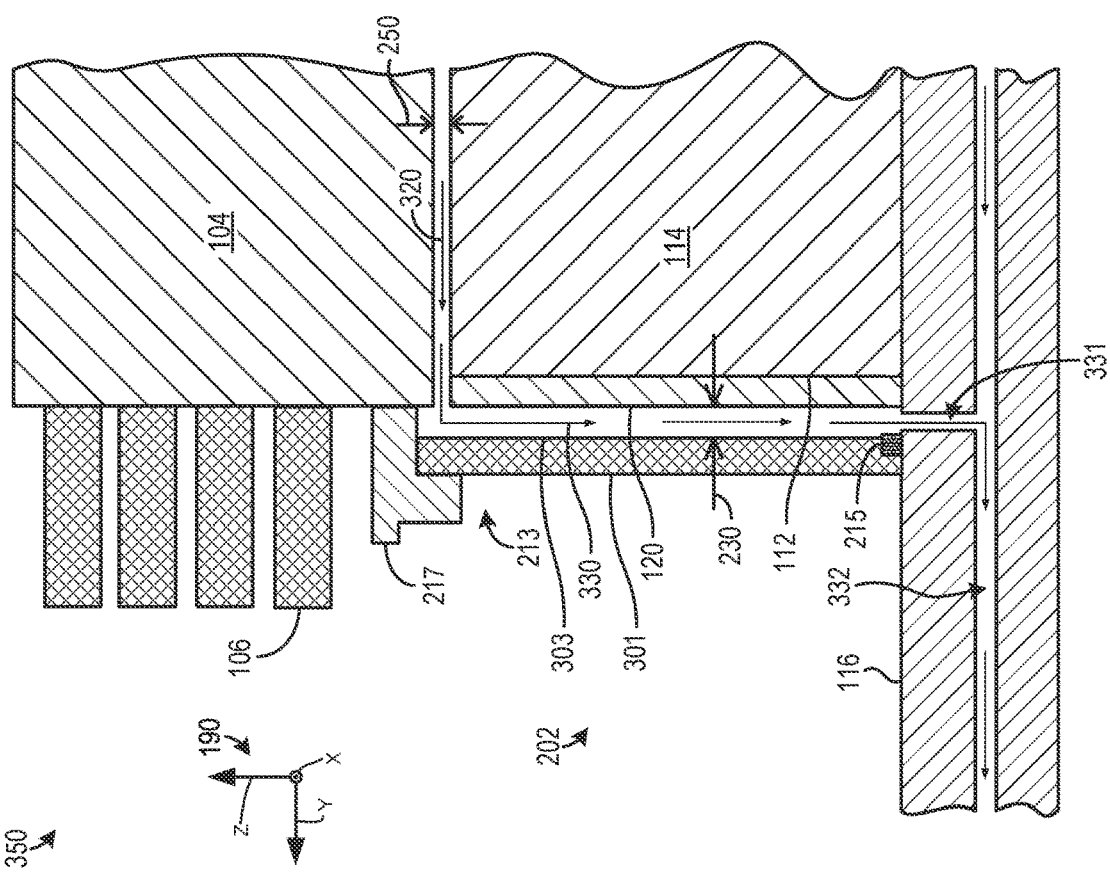
FIG. 3B

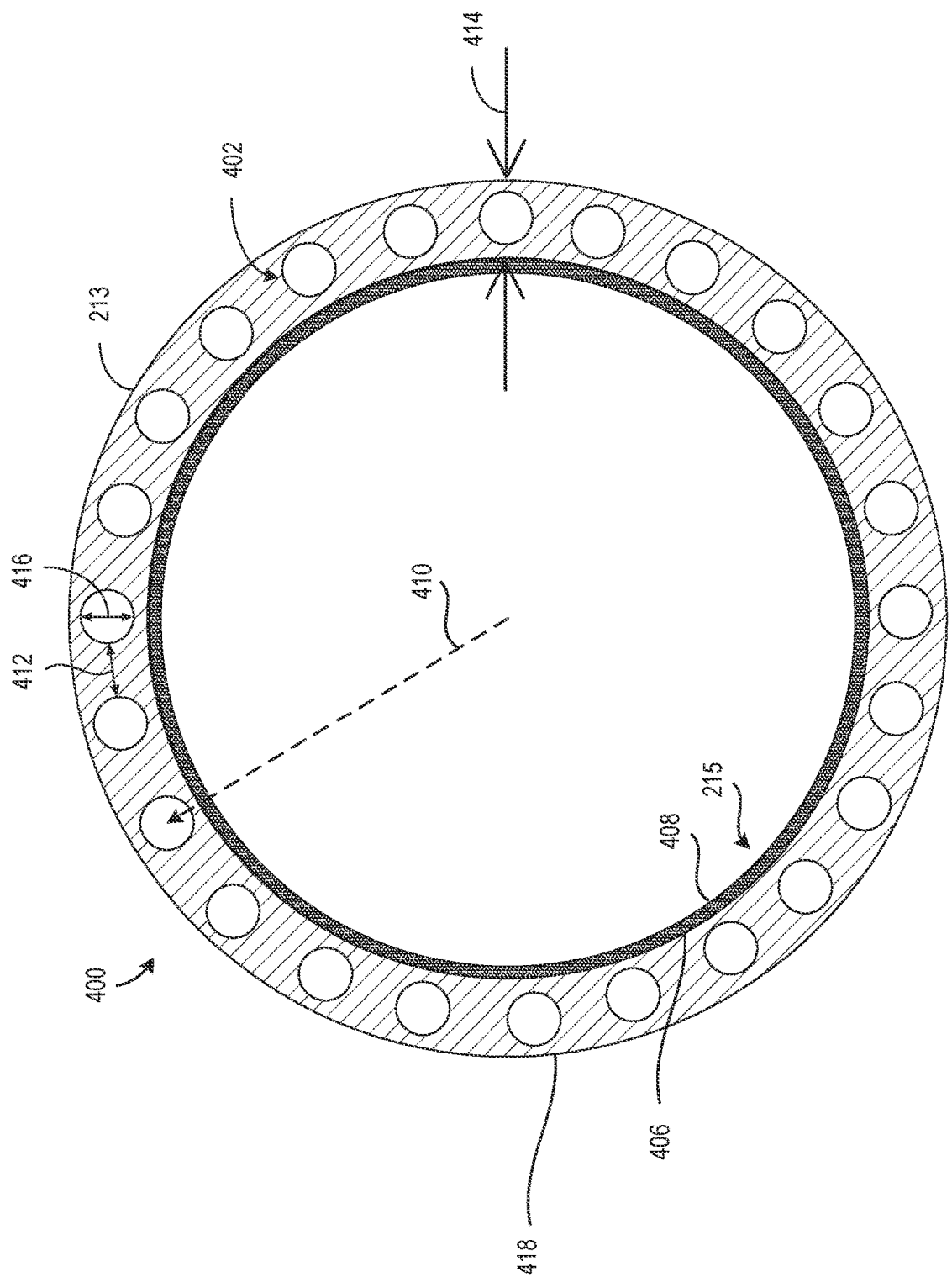

AIR GAP SCAVENGING SYSTEM FOR OIL COOLED ELECTRIC MOTOR

TECHNICAL FIELD

The present disclosure relates to a system for evacuating oil from a radial air gap of an electric motor.

BACKGROUND AND SUMMARY

In automotive applications, an electric motor may be used for multiple purposes, including as a starter motor, an electric drive assist (e.g., propulsion boost) as well as pure electric drive, a generator providing electric power for onboard electric loads and charging battery banks, and as a re-generator acting to convert the kinetic energy of the vehicle to electric power for charging the battery bank during braking/deceleration of the vehicle. For example, in an AC induction motor, the motor may generate torque through induction of current in a rotor. The induced currents in the rotor may be generated from magnetic fields in a stator, the latter of which may be generated through application of an AC voltage to conductive windings contained therein. The induced current within the rotor may then experience a force from the magnetic fields acting on the rotor, causing it to rotate in such a way as to align the magnetic fields generated by the induced current in the rotor with the magnetic fields of the stator. Application of an AC voltage may then serve to generate continuous rotational motion of the rotor, generating torque which may be converted into useful motion.

In electric motors, the torque provided by the motor is proportional to the product of the current circulating in the wires and the magnetic flux density. Both the magnetic flux density and the current components of the torque have loss components which decrease the efficiency of the electric motor. The current-related loss component is due to current flow through conductors (e.g., losses within windings and rotor bars). As speed and torque are increased, heat dissipation increases. Significant heat losses in an induction motor come from the current flow, which dissipates heat proportionate to electric power. In order to cool the conductors in the electric motor during operation, a coolant may be routed through the cavities contained therein, such as through pumping of a coolant oil into a cavity formed by a housing of the electric motor. However, such coolant oil may flood a radial air gap between the stator and the rotor, and the coolant oil contained therein may experience shear stress due to the relative motion between the rotor and stator, inducing fluid flow and dissipating the rotational energy generated by the rotor. For example, at high speeds, the motor may experience significant drag losses from the coolant oil contained in the radial air gap. Additional windage losses may occur due to air in the radial air gap, even in a non-oil cooled motor. Hence, a method to reduce the amount of coolant oil and air contained in the radial air gap from dissipating rotational motion of the rotor may be desired, as recognized by the inventors herein.

To overcome at least some of the aforementioned challenges recognized by the inventors herein, a system for an electric motor is provided, comprising: a ring covering a radial air gap between a stator and a rotor, the ring configured to route coolant out of the radial air gap via one or more channels. In this way, by encapsulating the radial air gap and routing excess coolant oil and air from the radial air gap via the ring into one or more channels, the radial air gap may not be flooded with coolant oil. The reduction of excess coolant oil in the radial air gap may reduce excessive drag from the coolant oil induced by the relative motion of the rotor and the stator. Additionally, windage losses due to air within the radial air gap may also be reduced, due to a partial vacuum that is generated within the radial air gap.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3A shows a first example embodiment of a system for removing coolant from a radial air gap of the electric motor as depicted in FIG. 2, including detail of flow of coolant oil through a first conduit, a ring covering the radial air gap, and a plurality of fluid lines coupled to a ring.

FIG. 3B shows a second example embodiment of the system for removing coolant from the radial air gap of the electric motor, including detail of flow of coolant oil through a first conduit, a second conduit, and internal channels of a rotor shaft.

FIG. 4 shows an example embodiment of the ring in the electric motor, including a plurality of intake holes distributed evenly along a circumference of the ring.

DETAILED DESCRIPTION

The following description relates to a system for evacuation of excess coolant oil from a radial air gap between a rotor and a stator of an electric motor. The system includes a ring and a sealing plate attached at opposite ends of the stator, encapsulating the radial air gap between the rotor and stator. In the first example embodiment of FIG. 3A, each of the ring and sealing plate may include a plurality of intake holes such as in the form of circular cutouts. The ring and sealing plate may be fluidly coupled to a scavenge pump through the air intake holes of the ring and sealing plate. In the second example embodiment of FIG. 3B, the ring and a first balancing plate of the rotor may form a first conduit, through which coolant may flow into internal channels of a rotor shaft fluidly coupled to the scavenge pump, and the sealing plate and a second balancing plate of the rotor may form a second conduit, through which coolant may flow into the internal channels of the rotor shaft fluidly coupled to the scavenge pump. Similarly to FIG. 3A, in the third example embodiment of FIG. 3C, each of the ring and sealing plate may include the plurality of intake holes in the form of circular cutouts. The ring and sealing plate may be fluidly coupled to the scavenge pump through the air intake holes of the ring and sealing plate. In each of the embodiments depicted in FIGS. 3A-C, the scavenge pump may generate a vacuum in the radial air gap to remove coolant oil and air from the radial air gap. The scavenge pump may be connected to a rotor shaft mechanically through a transmission or may be driven electrically. Coolant oil removed from the radial air gap may then be routed to a reservoir of the scavenge pump, after which it may further pass through a filter, and may then be recirculated through the electric motor.

In this way, by pumping excess coolant oil out of the radial air gap of the electric motor, drag losses within the radial air gap due to shear stress on the coolant oil may be reduced. Additionally, due to the vacuum generated by the scavenge pump, excess air may also be evacuated from the radial air gap, leading to decreased windage losses. Methods for sealing the radial air gap may be costly and technologically complex. By pumping out excess coolant oil via the scavenge pump, a small amount of oil in the radial air gap may be tolerated, maintaining cooling properties of the oil, while excessive drag losses may be reduced.

Figure 1:
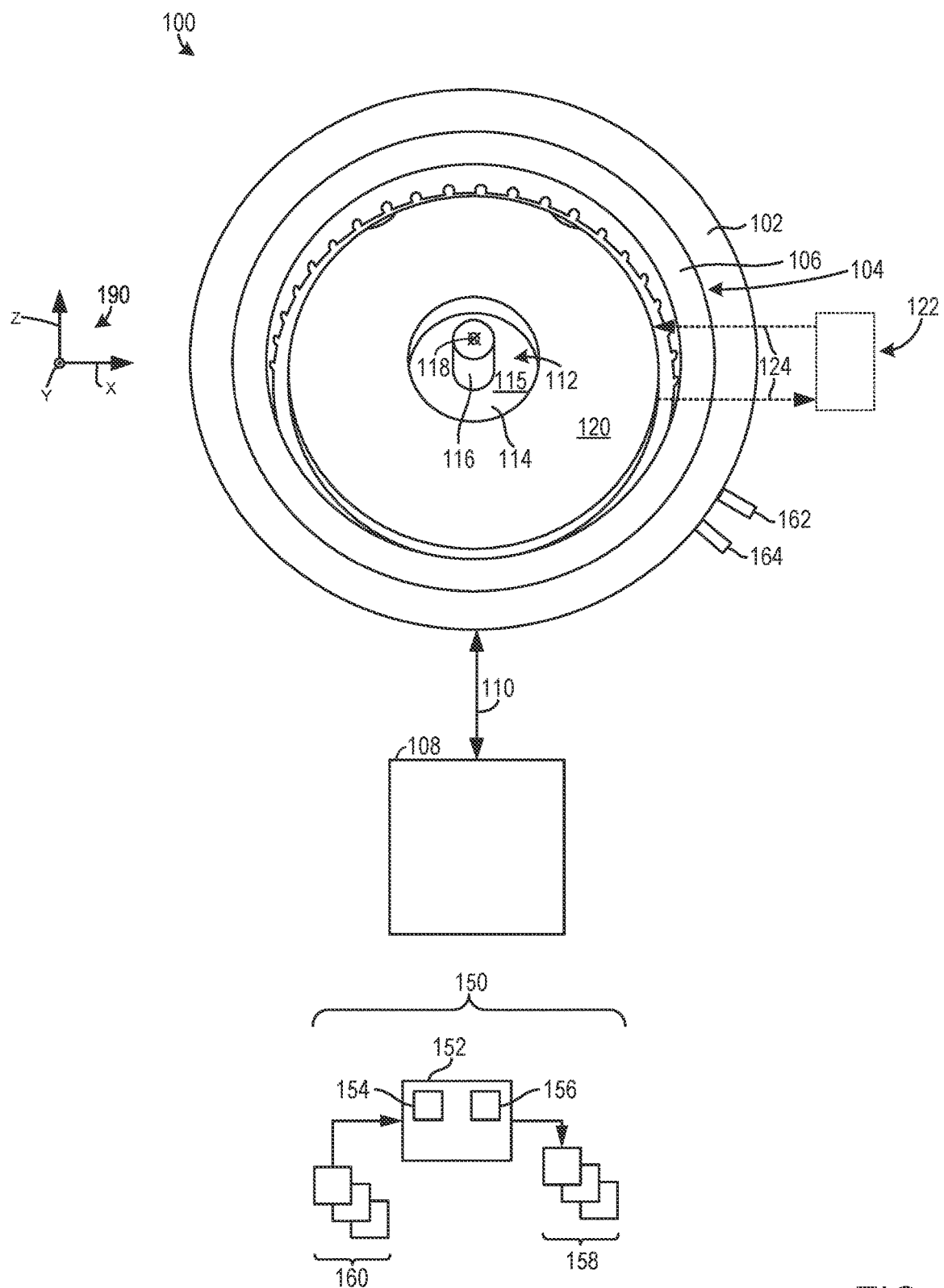
FIG. 1 shows an end view of an electric motor.

FIG. 1 illustrates a cross-sectional view of an example of an electric motor 100. It will be appreciated that the cross-sectional view of FIG. 1 is taken through a radially aligned plane. The electric motor 100 may be deployed in variety of operating environments including: automotive applications (e.g., light, medium, and heavy duty vehicles), industrial settings, agricultural equipment, etc. For instance, in one use-case scenario, the electric motor 100 may be integrated into a hybrid vehicle or battery electric vehicle (BEV).

A variety of suitable electric motor configurations may be used depending on the end-use design goals. For example, the motor may be an alternating current (AC) motor or a direct current (DC) motor. AC motor types include asynchronous (e.g., squirrel cage and wound rotor) and synchronous style motors. Synchronous motors, such as multiphase motors, may be used in certain embodiments. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

The electric motor 100 includes a housing 102 that encloses internal components. A stator 104 including a first end winding 106 may be enclosed via the housing 102. The first end winding 106 may include a plurality of wound or hairpin wires (e.g., round wires, rectangular wires, flat wires, etc.) which are outside a core of the stator 104. However, it will be appreciated that the stator core also includes wire sections which extend therethrough. Further, the stator 104 may receive electrical energy from an energy storage device 108 (e.g., battery, capacitor, and the like) and in some cases, such as when the motor is designed with regeneration functionality, transfer electrical energy to the energy storage device 108. Arrow 110 denotes this energy transfer. The electric motor further includes a rotor 112 with a rotor core 114 a rotor shaft 116 rotating about axis 118. The axis 118 is also provided in FIG. 2 for reference. It will be understood that a radial direction is any direction perpendicular to the axis 118. Additionally, a coordinate system 190 including an x-axis, y-axis, and z-axis is also provided for reference. The z-axis may be a vertical axis, the x-axis may be a lateral axis, and/or the y-axis may be a longitudinal axis, in one example. However, the axes may have other orientations, in other examples. It will be appreciated that the electric motor may be designed to generate rotational output in a first rotational direction and, in certain examples, a second rotational direction. Further, in some examples, the electric motor may be designed to operate in a regeneration mode where the motor receives rotational input and generates electrical energy responsive to receiving the rotational input.

The rotor core 114 may include a plurality of metal laminations (e.g., laminated magnetic steel or iron) or a solid magnetic metal. Thus, the rotor core 114 includes a magnetically interactive portion (e.g., permanent magnet or electromagnet). It will be appreciated that during motor operation the rotor 112 may rotate while the stator 104 is held relatively stationary.

The stator 104 and the rotor 112 are configured to electromagnetically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor 100 is configured to generate rotational output and, in some examples, in a regeneration mode, receive rotational input and generate electrical energy output. Thus, the electric motor 100 may be designed to receive electrical energy from the energy storage device 108 and, in some examples, transfer energy to the energy storage device. Wired and/or wireless energy transfer mechanisms may be used to facilitate this energy transfer functionality.

A first balancing plate 120 is shown attached to the rotor core 114. The first balancing plate 120 may be designed to account for imbalances in the rotor 112. To elaborate, the mass and mass distribution of the first balancing plate 120 may be selected to counterbalance residual unbalanced forces in the motor. In other words, the balancing plate may provide substantial counterbalance functionality, in one example.

A liquid cooling system 122 configured to circulate a working fluid, such as a low viscosity coolant oil, through the electric motor 100 may be included therein. As shown, the liquid cooling system 122 may include fluid lines 124, which may be used by liquid cooling system 122 to circulate coolant oil throughout the electric motor 100. Details of the cooling system will be elaborated further with reference to FIG. 2.

The electric motor 100 may be coupled to a control system 150 with a controller 152. The controller 152 includes a processor 154 (e.g., a microprocessor unit and/or other types of circuits) and memory 156 (e.g., random access memory, read only memory, keep alive memory, combinations thereof, etc.). The controller 152 may be configured to send control commands to system components 158 as well as receive signals from sensors 160 and other suitable components. The controllable components may include the electric motor 100 (e.g., the motor's stator). It will be understood that the controllable components may include actuators to enable component adjustment. The sensors may include a motor temperature sensor 162, a rotor position sensor 164, etc. As such, the controller 152 may receive a signal indicative of the motor's speed and adjust the output of the motor based on the speed signal. Other controllable components in the electric motor may function in a similar manner. Furthermore, it will be understood that the controller 152 may send and receive signals via wired and/or wireless communication.

Figure 2:
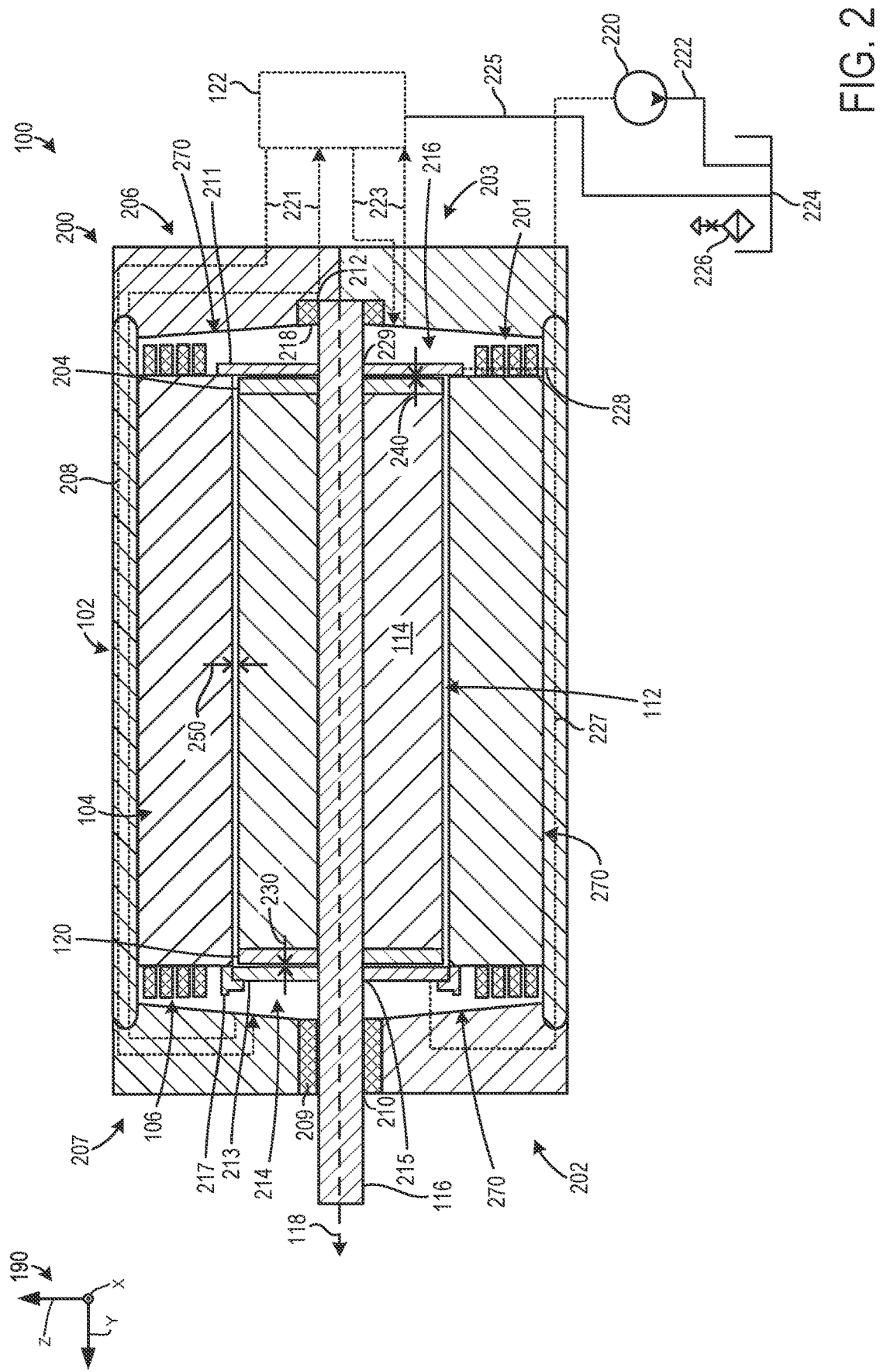
FIG. 2 shows a cross-sectional view of an example embodiment of a cooling system in the electric motor, illustrated in FIG. 1.

FIG. 2 illustrates another cross-sectional view 200 of the electric motor 100. The components of the motor previously described are similarly numbered and not reintroduced. The cross-sectional view may be taken along a radial cross-section of the electric motor 100, such that the cross-sectional view is in the y-z plane, as indicated by coordinate system 190, with the axis 118 of the rotor shaft 116 parallel to the y-axis. The stator 104 includes a first end winding 106 and second end winding 201. The first end winding 106 and the second end winding 201 are positioned on a first end 202 and a second end 203 of the electric motor 100, respectively. The first balancing plate 120 is shown along with a second balancing plate 204. The balancing plates 120, 204 are also arranged on ends 202, 203, respectively, of the electric motor 100. The mass distribution within balancing plates 120, 204 may be engineered to counterbalance uneven distribution of mass within the rotor core 114, which may otherwise contribute to rotating unbalance.

The electric motor 100 also includes a first end cap 207 and a second end cap 206. The end caps 206, 207 may extend from the rotor shaft 116 to a body 208 of the housing 102. In this way, housing 102 may form a cavity 270 which may serve to seal off the components of electric motor 100 contained therein. Rotor front bearing 209 is attached to the rotor shaft 116 as schematically depicted in FIG. 2. The rotor front bearing 209 supports and permits rotation of the rotor shaft 116. Roller element bearings, plain bearings, and the like may be selected for use based on motor design targets. The rotor front bearing 209 may be at least partially enclosed in the first end cap 207, as depicted in FIG. 2. A front shaft liquid seal 210 may be included between the rotor shaft 116 and the rotor front bearing 209 in order to prevent coolant oil from leaking via the rotor front bearing 209. The rotor shaft 116 may also extend into the second end cap 206, and rotate relative to the second end cap 206 via a rotor back bearing 218. The rotor back bearing 218 may be at least partially enclosed in the second end cap 206, depicted in FIG. 2. Further, there may be a back shaft liquid seal 212 included between the rotor shaft 116 and the rotor back bearing 218 in order to prevent coolant oil from leaking via the rotor back bearing 218.

Affixed to the stator 104 at the first end 202 of the electric motor 100 is a bracket 217. In one example, bracket 217 may be a single circumferential bracket in face-sharing contact with the stator 104 at the first end 202, and may be positioned such that an arm of bracket 217 may partially hang over a radial air gap 250 in a circumferential manner. Additionally, bracket 217 may be formed of a non-magnetic, electrically insulating material as to not impact the performance of the motor. In another example, there may be one or more brackets 217 coupled to the stator 104 at different locations on the stator 104 at the first end 202. The one or more brackets 217 may overhang above the radial air gap 250. The bracket 217 may be included in the first example embodiment of a system for removing coolant from the radial air gap 250, as shown in FIG. 3A, and the second example embodiment of a system for removing coolant from the radial air gap 250, as shown in FIG. 3B.

The radial air gap 250 may be a cylindrical, tubular empty space of fixed thickness between the outer curved face of the rotor core 114 and the inner curved face of the stator 104. The radial air gap 250 may be maintained in order to allow the rotor 112 to rotate freely within the stator in response to magnetic fields generated within the stator 104.

Figure 3C:
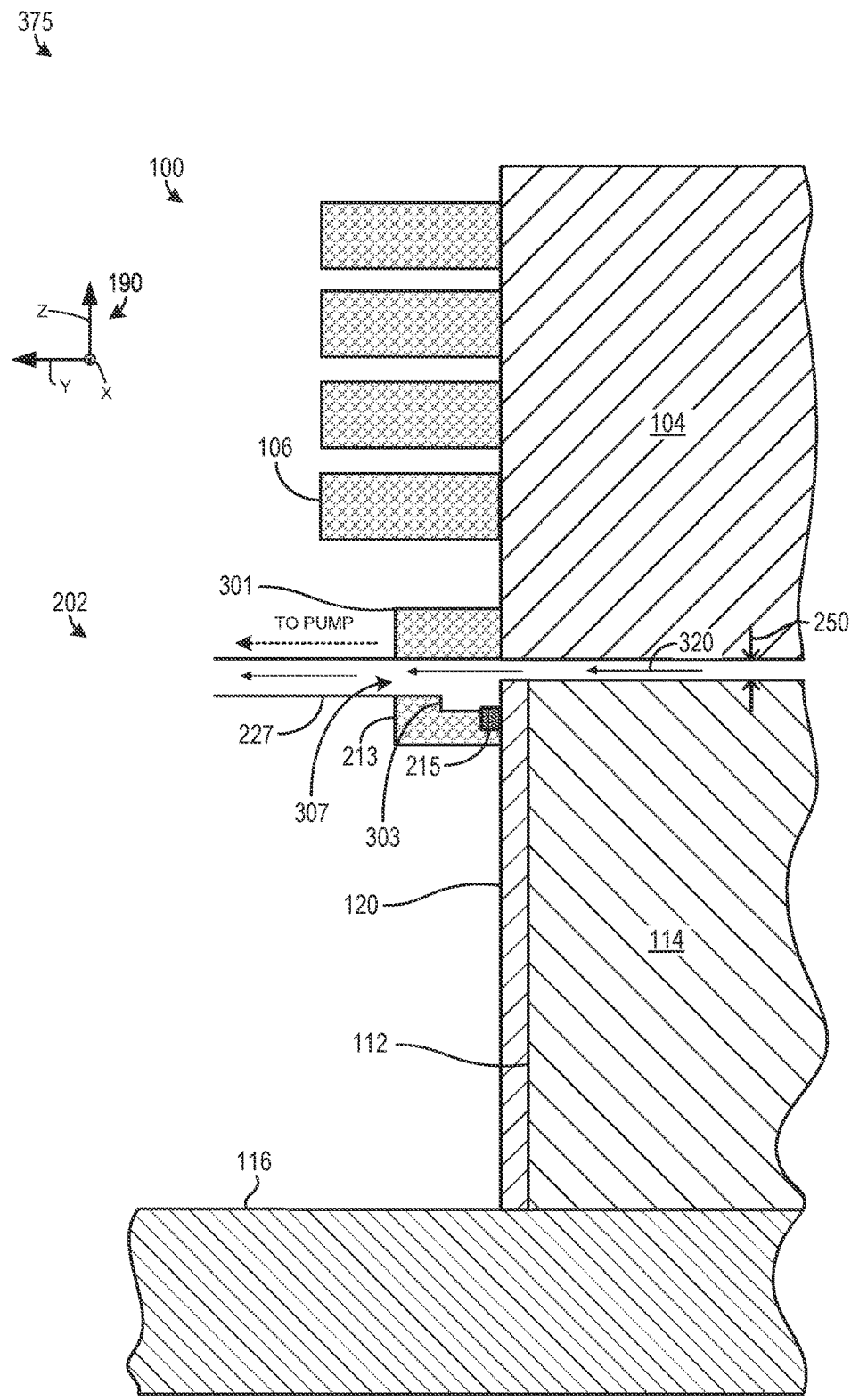
FIG. 3C shows a third example embodiment of the system for removing coolant from the radial air gap of the electric motor, including detail of flow of coolant oil through a ring covering the radial air gap, and a plurality of fluid lines coupled to the ring, without the first conduit of FIGS. 3A, 3B.

Affixed to the bracket 217 is the ring 213. The ring 213 may be affixed within the portion of the bracket 217 overhanging the radial air gap 250, such that the ring 213 covers the radial air gap 250 at the first end 202 of the electric motor 100, and is parallel to the first balancing plate 120. In the example in which there may be more than one bracket 217 overhanging the radial air gap 250, the ring 213 may be coupled to the one or more brackets 217 at one or more contact locations on the ring 213. In the first example embodiment of FIG. 3A and the second example embodiment of FIG. 3B, the ring 213 and the first balancing plate 120 may be separated by a first conduit 230, and the ring 213 may extend from the bracket 217 to the rotor shaft 116. In one example, the width of first conduit 230 may be significantly smaller than the width of ring 213. First conduit 230 may be contiguous (e.g., in fluidic communication) with radial air gap 250. In a third embodiment of a system for removing coolant from the radial air gap 250 as depicted in FIG. 3C, the ring 213 may extend over a region covering the radial air gap 250 which is slightly longer (such as within 10%) but significantly similar to the width of the radial air gap 250 without extending to the rotor shaft 116, and may be directly coupled (without the use of bracket 217) to each of the stator 104 and the first balancing plate 120 at the first end 202 of the electric motor 100. Detail of the stator 104, rotor core 114, bracket 217, first balancing plate 120, and ring 213 is described in more detail in relation to the embodiments depicted in FIGS. 3A-C.

A first dynamic seal 215 may be attached to an inner circumference of ring 213 on either a first side of the ring 213 facing towards the radial air gap 250, or on a second side of the ring 213 facing away from the radial air gap 250. In the first embodiment depicted in FIG. 3A and the second embodiment depicted in 3B, first dynamic seal 215 may be in contact with rotor shaft 116, and may permit rotation of the rotor shaft 116. In the third embodiment of FIG. 3C, first dynamic seal 215 may be in contact with the first balancing plate 120, and may permit rotation of the rotor 112 relative to the ring 213. First dynamic seal 215 may be any of a labyrinth seal, an O-ring, or a lip seal. In this way, oil in the radial air gap 250 may be fluidly isolated from the first enclosure 214 of the housing 102. Addition of the first dynamic seal 215 at the rotor shaft 116 may allow for reduced drag torque due to reduced tip velocities at the rotor shaft 116, as compared to drag torque induced with application of a seal directly covering the radial air gap 250. Embodiments including a first dynamic seal 215 are described in further relation to FIGS. 3A-C.

In another example, electric motor 100 may include a bearing (not shown) placed in contact with each of the ring 213 and the rotor shaft 116, permitting rotation of the rotor shaft 116 relative to the ring 213. In addition to the bearing, there may be a liquid seal, for example a grease seal, placed between the bearing and the rotor shaft 116, in order to prevent fluid coupling of the radial air gap 250 with the first enclosure 214.

A sealing plate 211 may be coupled to the stator 104 at the second end 203 of the electric motor 100, such that the sealing plate 211 covers the radial air gap 250 at the second end 203 of the electric motor 100. Sealing plate 211 may be coupled to stator 104 in face-sharing contact, such that the stator 104 may serve to fluidly seal off the radial air gap 250 from the second enclosure 216 of cavity 270 at the second end 203 of the electric motor 100. In one example, sealing plate 211 may be overmolded onto the stator 104 at the second end 203 of the electric motor 100. The sealing plate 211 and the second balancing plate 204 may be separated by a second conduit 240. In this way, the radial air gap 250 may be fluidly coupled to each of the first conduit 230 formed between the ring 213 and a first balancing plate 120 of the rotor 112, and a second conduit 240 formed between the sealing plate 211 and the second balancing plate 204 of the rotor. In one example, the width of second conduit 240 may be significantly smaller than the width of sealing plate 211. Second conduit 240 may be contiguous (e.g., in fluidic communication) with radial air gap 250. The sealing plate 211 may be affixed to the body of stator 104 prior to insertion of the wires of end windings 106, 201. Insertion of the wires which make up end windings 106, 201 after the sealing plate 211 is affixed to the stator 104 may be accomplished due to the wires being hairpin wires, which may be inserted into the stator 104 after manufacturing of the stator stack is completed. The ring 213 and the sealing plate 211 together may circumferentially cover the rotor core 114 at the first end 202 and the second end 203 of the electric motor 100, respectively.

The sealing plate 211 may include a second dynamic seal 229 attached to an inner circumference of sealing plate 211 on either a first side of the sealing plate 211 facing towards the radial air gap 250, or on a second side of the sealing plate 211 facing away from the radial air gap 250. The second dynamic seal 229 may be in contact with rotor shaft 116, and may permit rotation of the rotor shaft 116 relative to the sealing plate 211. Second dynamic seal 229 may be any of a labyrinth seal, an O-ring, or a lip seal. In this way, the radial air gap 250 may be fluidly sealed at the first end 202 of the electric motor 100 via a first dynamic seal 215 mechanically coupling the ring 213 to rotating components of the electric motor 100, and the radial air gap 250 may be fluidly sealed at the second end 203 of the electric motor 100 via a second dynamic seal 229 coupling the sealing plate 211 to the rotating components of the electric motor 100.

Electric motor 100 may further include a scavenge pump 220 fluidly coupled to one or more channels, the scavenge pump 220 configured to remove coolant from the radial air gap 250 via the one or more channels. As depicted in FIG. 2 and further illustrated in the first example embodiment of FIG. 3A, the one or more channels may be a plurality of first fluid lines 227 coupled to the ring 213, with each fluid line of the plurality of first fluid lines 227 coupled to at least one intake hole of a plurality of intake holes (to be described further in relation to FIGS. 3A, 3C, 4). The plurality of intake holes may be evenly distributed along a circumference of the ring 213. Each of the plurality of intake holes may penetrate through a thickness of the ring 213, such that the intake holes extend from a first side of the ring 213 to a second side of the ring 213. An amount of coolant oil contained in the radial air gap 250 may flow parallel to axis 118 along the positive Y axis, towards ring 213.

Upon reaching a junction of the first balancing plate 120 and the ring 213, excess coolant may enter the first conduit 230, as depicted in the first example embodiment of FIG. 3A. Upon entering the first conduit 230, coolant may then flow past each of the ring 213 and the first balancing plate 120, and may leave the first conduit 230 and flow through the ring 213 via each of the plurality of intake holes. Coolant may then be drained out from each of the intake holes via each of the plurality of first fluid lines 227 due to a vacuum generated by scavenge pump 220.

In an alternate embodiment, such as the third example embodiment of FIG. 3C, upon reaching the junction of the first balancing plate 120 and the ring 213, excess coolant may flow directly through each of a plurality of intake holes of the ring 213. Coolant may then be drained out from each of the plurality of intake holes via each of the plurality of first fluid lines 227 due to a vacuum generated by scavenge pump 220. In this way, flooding of the radial air gap 250 may be reduced, thereby reducing fluid drag losses.

Similarly, as depicted in FIG. 2 and further described in relation to the first example embodiment of FIG. 3A and the third example embodiment of FIG. 3C, the sealing plate 211 may be coupled to a scavenge pump 220 configured to remove excess air and coolant oil from the radial air gap 250. The scavenge pump 220 may be coupled to the sealing plate 211 via a plurality of second fluid lines 228, with each fluid line of the plurality of second fluid lines 228 coupled to at least one intake hole of a plurality of intake holes. The plurality of intake holes may be evenly distributed along a circumference of the sealing plate 211. Each of the plurality of intake holes may penetrate through a thickness of the sealing plate 211, such that the intake holes extend from a first side of the sealing plate 211 to a second side of the sealing plate 211. An amount of coolant oil contained in the radial air gap 250 may flow parallel to axis 118 along the negative Y axis, towards sealing plate 211.

Upon reaching a junction of the second balancing plate 204 and the sealing plate 211, excess coolant may enter the second conduit 240, flowing past each of the sealing plate 211 and the second balancing plate 204, may leave the second conduit 240 and flow through the sealing plate 211 via each of the plurality of intake holes. Coolant may then be drained out from each of the intake holes via each of the plurality of second fluid lines 228 due to a vacuum generated by scavenge pump 220. In this way, flooding of the radial air gap 250 may be reduced, thereby reducing fluid drag losses.

The scavenge pump 220 may generate a vacuum in the radial air gap 250, which may force a combination of coolant oil and air contained therein into fluid lines 227, 228, respectively. In one example, scavenge pump 220 may be a mechanical pump and may be connected to the rotor shaft 116 through a transmission (not shown). In another example, scavenge pump 220 may be driven electrically. In the case that scavenge pump 220 is an electric scavenge pump, the volume of pumped material per unit time by scavenge pump 220 may be optimized in order to increase efficiency of the electric motor 100.

Oil that is pumped by scavenge pump 220 from the radial air gap 250 via fluid lines 227, 228 may then further drain into a reservoir 224 (such as a sump) via a third fluid line 222. The coolant oil contained in reservoir 224 may then be filtered via a filter 226, and recirculated via a fourth fluid line 225 back into the cavity 270 formed by housing 102 of electric motor 100. In one example, the scavenge pump 220 may be continually operated during operation of the electric motor while coolant is being circulated through the motor components. In another example, the scavenge pump 220 may be coupled to the rotor shaft 166 and may be mechanically operated to either run continuously or be operated via a clutch. In yet another example, the scavenge pump 220 may be intermittently operated based on flow of coolant through the electric motor 100 and the operating speed of the electric motor 100, such that any excess coolant may be removed from the radial air gap 250.

In the second example embodiment depicted in FIG. 3B, the electric motor 100 may not include fluid lines 227, 228, and the scavenge pump 220 may directly pump out coolant via fluid channels in the rotor shaft 116. In particular, coolant may be routed from the radial air gap 250 via each of the first conduit 230 and the second conduit 240 to a reservoir by the scavenge pump 220, the coolant flowing from each of the first conduit 230 and the second conduit 240 to the reservoir 224 via fluid channels housed within an interior of the rotor shaft 116. In such an embodiment, the scavenge pump 220 may be operated either continuously, or in response to any of a speed of the electric motor 100, temperature of coolant in the radial air gap 250, and flow rate of coolant through the radial air gap 250. Coolant gathered by the scavenge pump 220 may then flow to a reservoir 224 to be filtered and then circulated through the electric motor 100 via liquid cooling system 122.

The electric motor 100 may contain the liquid cooling system 122. Liquid cooling system 122 may be configured to circulate a liquid coolant (such as oil) throughout the cavity 270 of the housing 102, in order to cool the components of electric motor 100 contained therein. The liquid cooling system 122 may also include a heat exchanger to cool the coolant oil and a pump for circulating the coolant oil. The coolant oil circulating system may also include the reservoir 224 (e.g., sump). In the example embodiment given, liquid cooling system 122 may be configured to circulate coolant oil through the first enclosure 214 and the second enclosure 216 via fluid lines 221 and 223, respectively. Fluid lines 221 and 223 may be the same as the fluid lines 124 of FIG. 1. Further, circulation of coolant oil may be facilitated through drainage to and pumping from the reservoir 224 contained within the liquid cooling system 122 through fluid lines 221 and 223. Additionally, liquid cooling system 122 may be configured to obtain coolant oil from reservoir 224 after it is filtered by filter 226 via the fourth fluid line 225. For example, filtered coolant oil from reservoir 224 may drain into a reservoir of the liquid cooling system 122, after which the oil contained in the reservoir of liquid cooling system 122 may be recirculated through the first enclosure 214 and the second enclosure 216. However, other example embodiments of liquid cooling system 122 may be used, and the given embodiment is intended to be illustrative and not limiting in any sense.

The housing 102 and end caps 206, 207 may be constructed out of a metal such as steel, aluminum, combinations thereof, etc. In one example, the housing 102 and end caps 206, 207 may comprise aluminum due to its higher thermal conductivity than steel, for example. However, housing 102 and/or end caps 206, 207 constructed out of steel may be used due to its lower cost and/or higher durability. The wires in the end windings 106, 201 may be constructed out of an electrically conductive material such as copper. The stator 104 may also be constructed out of steel (e.g., laminated steel). Additionally, the balancing plates 120, 204 may be constructed out of a metal (e.g., steel, aluminum, combinations thereof, etc.). Further, the rotor 112 may be constructed out of steel, copper, aluminum, etc.

FIGS. 3A-3C show respective example embodiments 300, 350, and 375 of systems for removing coolant from the radial air gap 250 of the electric motor 100 of FIGS. 1-2. A cross-sectional view depicted in each of FIGS. 3A-3C may be taken along a radial cross-section of the electric motor 100, such that the cross-sectional view is in a y-z plane of coordinate system 190, with an axis (such as axis 118 of FIG. 2) of the rotor shaft 116 parallel to the y-axis. In each of the example embodiments depicted in FIGS. 3A-3C, coolant flows through the radial air gap 250 between the stator 104 and the rotor core 114 of an electric motor (such as electric motor 100 of FIGS. 1-2), as indicated by arrows 320, 330. In one example, the coolant may be oil, and may serve to cool the electric motor 100, in addition to providing lubrication. Flow of the coolant oil may be generated through shear forces imposed on the coolant oil through the relative motion of the stator 104 and the rotor core 114, which may also generate drag losses. Further flow may be generated from a scavenge pump (such as scavenge pump 220 of FIG. 2), which may generate a vacuum to evacuate the radial air gap 250 of excess coolant oil, preventing the radial air gap 250 from being flooded with coolant oil.

First example embodiment 300 of FIG. 3A depicts a system for removing coolant oil from the radial air gap 250 of the electric motor 100. As mentioned in relation to FIG. 2, bracket 217 may be a single circumferential bracket in face-sharing contact with the stator 104 at the first end 202, and may be positioned such that an arm of bracket 217 may partially hang over a radial air gap 250 in a circumferential manner. The bracket 217 may be mechanically coupled to the ring 213. The ring 213 may extend along the negative z-direction according to coordinate system 190 from a circumferential point of contact with the bracket 217, to a rotor shaft 116, with the ring 213 parallel to a first balancing plate 120 of the rotor 112. A first conduit 230 is formed between the first balancing plate 120 and the first side 303 of the ring 213, the first conduit 230 fluidly coupled to the radial air gap 250 at a junction of the first balancing plate 120 and the ring 213. Placed between the ring 213 and the rotor shaft 116 is a first dynamic seal 215, which may permit rotation of the rotor shaft 116 with respect to the ring 213, which remains static.

The ring 213 may be coupled to the scavenge pump configured to remove excess air and coolant oil from the radial air gap 250. In particular, the ring 213 may contain a plurality of intake holes evenly spaced around a circumference of the ring 213. Each of the plurality of intake holes may be a circular cutout that penetrates through a thickness of the ring 213, such that the intake holes extend from a first side 303 of the ring 213 to a second side 301 of the ring 213. The scavenge pump may then be coupled to the ring 213 via a plurality of first fluid lines 227, with each fluid line of the plurality of first fluid lines 227 coupled to at least one intake hole 307 of the plurality of intake holes.

Upon activation of the scavenge pump, oil may flow along the positive y-direction of coordinate system 190, from the radial air gap 250, radially inwards (e.g. along a negative z-direction according to the coordinate system 190) towards the rotor shaft 116 via first conduit 230, as indicated by arrows 320, 330. As the combination of air and coolant oil flows through the first conduit 230 in response to activation of the scavenge pump, the first dynamic seal 215 may serve to fluidly seal off the first conduit 230 from a first enclosure (such as first enclosure 214 of FIG. 2) during operation of the electric motor. Due to the vacuum generated by the scavenge pump, oil may then flow past the ring via each of a plurality of intake holes, such as intake hole 307, with each intake hole 307 of the plurality of intake holes coupled to each of the plurality of first fluid lines 227. Each fluid line of the plurality of first fluid lines may then lead to the scavenge pump. Additionally, the coolant oil in the radial air gap 250 flowing past the first conduit 230 may allow cooling of the first balancing plate 120.

On the second end 203 of the electric motor 100, the radial air gap 250 may be encapsulated by the sealing plate 211. Sealing plate 211 may be directly coupled to the stator 104 at the second end of the electric motor 100, e.g. via overmolding onto the stator 104 at the second end 203 of the electric motor 100. Sealing plate 211 may extend along the negative z-direction according to coordinate system 190 from a circumferential point of contact with the stator 104, to a rotor shaft 116, with the sealing plate 211 parallel to a second balancing plate 204 of the rotor 112. A second conduit 240 is formed between the second balancing plate 204 and the first side 304 of the sealing plate 211, the second conduit 240 fluidly coupled to the radial air gap 250 at a junction of the second balancing plate 204 and the sealing plate 211. Placed between the sealing plate 211 and the rotor shaft 116 is a second dynamic seal 229, which may permit rotation of the rotor shaft 116 with respect to the sealing plate 211, which remains static.

The sealing plate 211 may be coupled to the scavenge pump configured to remove excess air and coolant oil from the radial air gap 250. In particular, the sealing plate 211 may contain a plurality of intake holes evenly spaced around a circumference of the sealing plate 211. Each of the plurality of intake holes of the sealing plate 211 may be a circular cutout that penetrates through a thickness of the sealing plate 211, such that the intake holes extend from a first side 304 of the sealing plate 211 to a second side 302 of the sealing plate 211. The scavenge pump may then be coupled to the sealing plate 211 via a plurality of second fluid lines 228, with each fluid line of the plurality of second fluid lines 228 coupled to at least one intake hole 309 of a plurality of intake holes of the sealing plate 211.

The mechanism for coolant oil flow through a plurality of intake holes of the sealing plate 211 via the second conduit 240 may be significantly similar to the mechanism described above for coolant oil flow through the ring 213. Upon activation of the scavenge pump, oil may flow along the negative y-direction of coordinate system 190, from the radial air gap 250, radially inwards (e.g. along a negative z-direction according to the coordinate system 190) towards the rotor shaft 116 via the second conduit 240. As the combination of air and coolant oil flows through the second conduit 240 in response to activation of the scavenge pump, the second dynamic seal 229 may serve to fluidly seal off the second conduit 240 from a second enclosure (such as second enclosure 216 of FIG. 2) during operation of the electric motor 100. Due to the vacuum generated by the scavenge pump, oil may then flow past the sealing plate 211 via each of a plurality of intake holes of the sealing plate, with each intake hole 309 of the plurality of intake holes coupled to each of the plurality of second fluid lines 228. Each intake hole 309 of the sealing plate 211 may be a circular cutout passing through a second side 302 of the sealing plate 211 and the first side 304 of the sealing plate 211. Each fluid line of the plurality of second fluid lines 228 may then lead to the scavenge pump. Additionally, the coolant oil in the radial air gap 250 flowing past the second conduit may allow cooling of the second balancing plate.

Second example embodiment 350 of FIG. 3B depicts a system for removing oil from the radial air gap 250 of the electric motor 100. As mentioned in relation to FIG. 2, a circumferential bracket 217 may be placed in face-sharing contact with the stator 104 at the first end 202, and may be positioned such that an arm of bracket 217 may partially hang over a radial air gap 250 in a circumferential manner. The bracket 217 may be mechanically coupled to the ring 213. The ring 213 may extend along the negative z-direction according to coordinate system 190 from a circumferential point of contact with the bracket 217, to a rotor shaft 116, with the ring 213 parallel to a first balancing plate 120 of the rotor 112. A first conduit 230 is formed between the first balancing plate 120 and the first side 303 of the ring 213, the first conduit 230 fluidly coupled to the radial air gap 250 at a junction of the first balancing plate 120 and the ring 213. Placed between the ring 213 and the rotor shaft 116 is a first dynamic seal 215, which may permit rotation of the rotor shaft 116 with respect to the ring 213, which remains static.

In contrast to the first example embodiment 300 of FIG. 3A, ring 213 may not include intake holes. Instead, the first conduit 230 may be fluidly coupled to a first internal channel 331 of the rotor shaft 116 formed along an axis parallel to the z-axis of coordinate system 190. The first internal channel may meet at a right angle to a second internal channel 332 of the rotor shaft 116, the second internal channel 332 of the rotor shaft aligned axially along a central axis of the rotor shaft (such as axis 118 of FIG. 2), which is parallel to the y-axis of coordinate system 190.

Upon activation of the scavenge pump, the combination of air and coolant oil may flow along the positive y-direction of coordinate system 190, from the radial air gap 250, radially inwards (e.g. along a negative z-direction according to the coordinate system 190) towards the rotor shaft 116 via first conduit 230, as indicated by arrows 320, 330. As the combination of air and coolant oil flows through the first conduit 230 in response to activation of the scavenge pump, the first dynamic seal 215 may serve to fluidly seal off the first conduit 230 from a first enclosure (such as first enclosure 214 of FIG. 2) during operation of the electric motor. Due to the vacuum generated by the scavenge pump, coolant oil and air may then continue to flow along a negative z-direction of coordinate system 190 into a first internal channel 331 in the rotor shaft 116, which may be coupled fluidly coupled to a second internal channel 332, which in turn is fluidly coupled to and leads to the scavenge pump. Coolant oil may then flow within second internal channel 332 along the positive y-direction of coordinate system 190, into the scavenge pump. Additionally, the coolant oil in the radial air gap 250 flowing past the first conduit 230 may allow for cooling of the first balancing plate 120.

On the second end 203 of the electric motor 100, the radial air gap 250 may be encapsulated by the sealing plate 211. Sealing plate 211 may be directly coupled to the stator 104 at the second end of the electric motor 100, e.g. via overmolding onto the stator 104 at the second end 203 of the electric motor 100. Sealing plate 211 may extend along the negative z-direction according to coordinate system 190 from a circumferential point of contact with the stator 104, to a rotor shaft 116, with the sealing plate 211 parallel to a second balancing plate 204 of the rotor 112. A second conduit 240 is formed between the second balancing plate 204 and the first side 304 of the sealing plate 211, the second conduit 240 fluidly coupled to the radial air gap 250 at a junction of the second balancing plate 204 and the sealing plate 211. Placed between the sealing plate 211 and the rotor shaft 116 is a second dynamic seal 229, which may permit rotation of the rotor shaft 116 with respect to the sealing plate 211, which remains static.

In contrast to the first example embodiment 300 of FIG. 3A, sealing plate 211 may not include intake holes. Instead, the second conduit 240 may be fluidly coupled to a third internal channel 333 of the rotor shaft 116 formed along an axis parallel to the z-axis of coordinate system 190. The third internal channel 333 may meet at a right angle to the second internal channel 332 of the rotor shaft 116, the second internal channel 332 of the rotor shaft aligned axially along a central axis of the rotor shaft (such as axis 118 of FIG. 2), which is parallel to the y-axis of coordinate system 190.

The mechanism for coolant oil flow through a second conduit 240 generated by the scavenge pump may be significantly similar to the mechanism described above for coolant oil flow through the first conduit 230. The second conduit 240 may be formed from a first side 304 of the sealing plate 211 and a second balancing plate 204. Upon activation of the scavenge pump, coolant oil may flow from the radial air gap 250, along the negative y-direction of coordinate system 190, radially inwards (e.g. along a negative z-direction according to the coordinate system 190) towards the rotor shaft 116 via the second conduit 240, as indicated by arrows 320, 330. As the combination of air and coolant oil flows through the second conduit 240 in response to activation of the scavenge pump, the second dynamic seal 229 may serve to fluidly seal off the second conduit 240 from a second enclosure (such as second enclosure 216 of FIG. 2) during operation of the electric motor. Due to the vacuum generated by the scavenge pump, coolant oil may then continue to flow along the negative z-direction of coordinate system 190 into a third internal channel 333, which may be fluidly coupled to the second internal channel 332, which is fluidly coupled to and leads to the scavenge pump. Coolant oil may then flow within second internal channel 332 along the positive y-direction of coordinate system 190, into the scavenge pump. Additionally, the coolant oil in the radial air gap 250 flowing past the second conduit 240 may allow cooling of the second balancing plate 204.

Third example embodiment 375 illustrates a system for removal of coolant oil from the radial air gap 250 for the electric motor 100. In contrast to the first example embodiment 300 of FIG. 3A and the second example embodiment 350 of FIG. 3B, the third example embodiment 375 does not include a bracket (such as bracket 217 of FIGS. 2, 3A-B) affixed to a ring 213 to hold the ring 213 in a position parallel to a first balancing plate 120. Instead, the ring 213 may be directly mechanically coupled to each of the stator 104 and the first balancing plate 120 at the first end 202 of the electric motor 100, with a first dynamic seal 215 allowing relative motion of the rotor 112 with respect to the ring 213, which remains static. In other words, the sealing of the radial air gap 250 by the ring 213 and the first dynamic seal 215 is provided on the first balancing plate 120, without the ring 213 extending to the rotor shaft 116 as in FIGS. 3A-B. In particular, the ring 213 may overhang the radial air gap 250, with a width of the ring 213 along the z-direction of coordinate system 190 being greater than but significantly similar (such as within 10%) to the width of the radial air gap 250.

The ring 213 may be coupled to the scavenge pump configured to remove excess air and coolant oil from the radial air gap 250. In particular, the ring 213 may contain a plurality of intake holes evenly spaced around a circumference of the ring 213. Each of the plurality of intake holes may be a circular cutout that penetrates through a thickness of the ring 213, such that the intake holes extend from a first side 303 of the ring 213 to a second side 301 of the ring 213. The scavenge pump may then be coupled to the ring 213 via a plurality of first fluid lines 227, with each fluid line of the plurality of first fluid lines 227 coupled to at least one intake hole 307 of the plurality of intake holes.

Upon activation of the scavenge pump, oil may flow from the radial air gap 250 along the positive y-direction of coordinate system 190, as indicated by arrow 320. Upon leaving the radial air gap 250, oil may further flow past the ring via each of a plurality of intake holes, such as intake hole 307, with each intake hole 307 of the plurality of intake holes coupled to each of a plurality of first fluid lines (such as first fluid lines 227 of FIG. 2).

A second end (such as second end 203 of FIG. 2) of the electric motor 100 of the third embodiment 375 may be identical to the second end of the electric motor of the first embodiment 300 of FIG. 3A. In particular, following the description of the second end 203 of the electric motor 100 as depicted in the first embodiment 300 of FIG. 3A, on the second end 203 of the electric motor 100, the radial air gap 250 may be encapsulated by the sealing plate 211. Sealing plate 211 may be directly coupled to the stator 104 at the second end of the electric motor 100, e.g. via overmolding onto the stator 104 at the second end 203 of the electric motor 100. Sealing plate 211 may extend along the negative z-direction according to coordinate system 190 from a circumferential point of contact with the stator 104, to a rotor shaft 116, with the sealing plate 211 parallel to a second balancing plate 204 of the rotor 112. A second conduit 240 is formed between the second balancing plate 204 and the first side 304 of the sealing plate 211, the second conduit 240 fluidly coupled to the radial air gap 250 at a junction of the second balancing plate 204 and the sealing plate 211. Placed between the sealing plate 211 and the rotor shaft 116 is a second dynamic seal 229, which may permit rotation of the rotor shaft 116 with respect to the sealing plate 211, which remains static.

The sealing plate 211 may be coupled to the scavenge pump configured to remove excess air and coolant oil from the radial air gap 250. In particular, the sealing plate 211 may contain a plurality of intake holes evenly spaced around a circumference of the sealing plate 211. Each of the plurality of intake holes of the sealing plate 211 may be a circular cutout that penetrates through a thickness of the sealing plate 211, such that the intake holes extend from a first side 304 of the sealing plate 211 to a second side 302 of the sealing plate 211. The scavenge pump may then be coupled to the sealing plate 211 via a plurality of second fluid lines 228, with each fluid line of the plurality of second fluid lines 228 coupled to at least one intake hole 309 of a plurality of intake holes of the sealing plate 211.

The mechanism for coolant oil flow through a plurality of intake holes of a sealing plate (such as sealing plate 211 of FIG. 2) via a second conduit (such as second conduit 240 of FIG. 2) pump may be identical to the mechanism described above for coolant oil flow through the sealing plate as described in the first example embodiment 300 of FIG. 3A. The second conduit may formed from a first side of the sealing plate and a second balancing plate (such as second balancing plate 204 of FIG. 2). Upon activation of the scavenge pump, oil may flow along a negative y-direction of coordinate system 190, from the radial air gap 250, radially inwards (e.g. along a negative z-direction according to the coordinate system 190) towards the rotor shaft 116 via the second conduit. Due to the vacuum generated by the scavenge pump, oil may then flow past the sealing plate via each of a plurality of intake holes of the sealing plate, with each intake hole of the plurality of intake holes coupled to each of a plurality of second fluid lines (such as second fluid lines 228 of FIG. 2). Each intake hole of the sealing plate may be a circular cutout passing through a second side of the sealing plate and the first side of the sealing plate facing towards the radial air gap 250. Each fluid line of the plurality of second fluid lines may then lead to the scavenge pump. Additionally, the coolant oil in the radial air gap 250 flowing past the second conduit may allow cooling of the second balancing plate.

In contrast with the second embodiment 350, each of the first embodiment 300 and the third embodiment 375 illustrate systems for removing coolant oil from the radial air gap 250 of the electric motor 100, including the ring 213 which may cover the radial air gap 250 at the first end 202 of the electric motor 100, the ring 213 including a plurality of circular intake hole cutouts, the sealing plate 211 which may cover the radial air gap 250 at the second end 203 of the electric motor 100, the sealing plate 211 including another plurality of circular intake hole cutouts, and the scavenge pump coupled to each of the ring 213 and the sealing plate 211 to remove coolant. In particular, the ring 213 may be coupled to the scavenge pump by the first plurality of fluid lines 227, and the sealing plate 211 may be coupled to the scavenge pump by the second plurality of fluid lines 228. The scavenge pump may then be operated to pump air and coolant from the radial air gap 250 via each of the first plurality of fluid lines 227 and the second plurality of fluid lines 228, with a pumping strength of the scavenge pump based on one or more of a speed of the electric motor 100, temperature of coolant in the radial air gap 250, and flow rate of coolant through the radial air gap 250.

FIG. 4 shows an example 400 of the ring 213 of FIG. 2. The example 400 of ring 213 illustrates the outward facing face of ring 213 (e.g the second side 301 of the ring 213 depicted in FIGS. 3A-C). In other words, the example 400 of ring 213 illustrates the face of ring 213 which is external to the radial air gap 250. Such an example 400 of ring 213 may have a corresponding and significantly similar embodiment of sealing plate 211.

Example 400 of ring 213 is shown to have a plurality of intake holes 402 evenly spaced around the circumference of the ring 213. Said another way, a spacing 412 between the plurality of intake holes 402 along the circumference of the ring 213 may be uniform between adjacent pairs of intake holes 402. The plurality of intake holes 402 may be circular cutouts. All of the intake holes comprising the plurality of intake holes 402 may be the same as intake hole 307 of FIGS. 3A, 3C. In one example, a diameter 416 of an intake hole comprising the plurality of intake holes 402 may be at least 50% of a width 414 of the ring, for example may be approximately 70% of the width 414 of the ring. Additionally, a radial position 410 of a center of an intake hole comprising the plurality of intake holes 402 may be evenly situated between the inner circumference 408 and the outer circumference 418 of the ring 213.

The intake holes 402 may then be connected to fluid lines (such as first fluid lines 227 of FIG. 2), which may be connected to a scavenge pump (such as scavenge pump 220 of FIG. 2). In this way, coolant oil contained within a radial air gap (such as the radial air gap 250 of FIGS. 2-3) may be pumped out of the radial air gap through ring 213, preventing flooding of coolant oil within the radial air gap, and hence reducing drag losses from the induced motion of the coolant oil within the radial air gap. The example 400 of ring 213 is shown having 24 intake holes 402 with even spacing 412 around the circumference of the ring 213, however a different number of intake holes 402 may also be present in other embodiments. In one example, the ring 213 may be constructed out of a metal (e.g., steel, aluminum, combinations thereof, etc.).

In the present embodiment, a first dynamic seal 215 may be placed concentrically in contact with the inner circumferential surface 406 of the ring 213. The first dynamic seal 215 may be in contact with a rotor shaft (such as rotor shaft 116 of FIGS. 1-2) via the inner circumference 408 of first dynamic seal 215, and may permit rotation of the rotor shaft. First dynamic seal 215 may prevent leakage of coolant oil between the contact point of the rotor shaft and the inner circumference 408 of first dynamic seal 215, which may prevent a fluidic coupling between the radial air gap and another enclosure (such as first enclosure 214 of FIG. 2).

Figure 5:
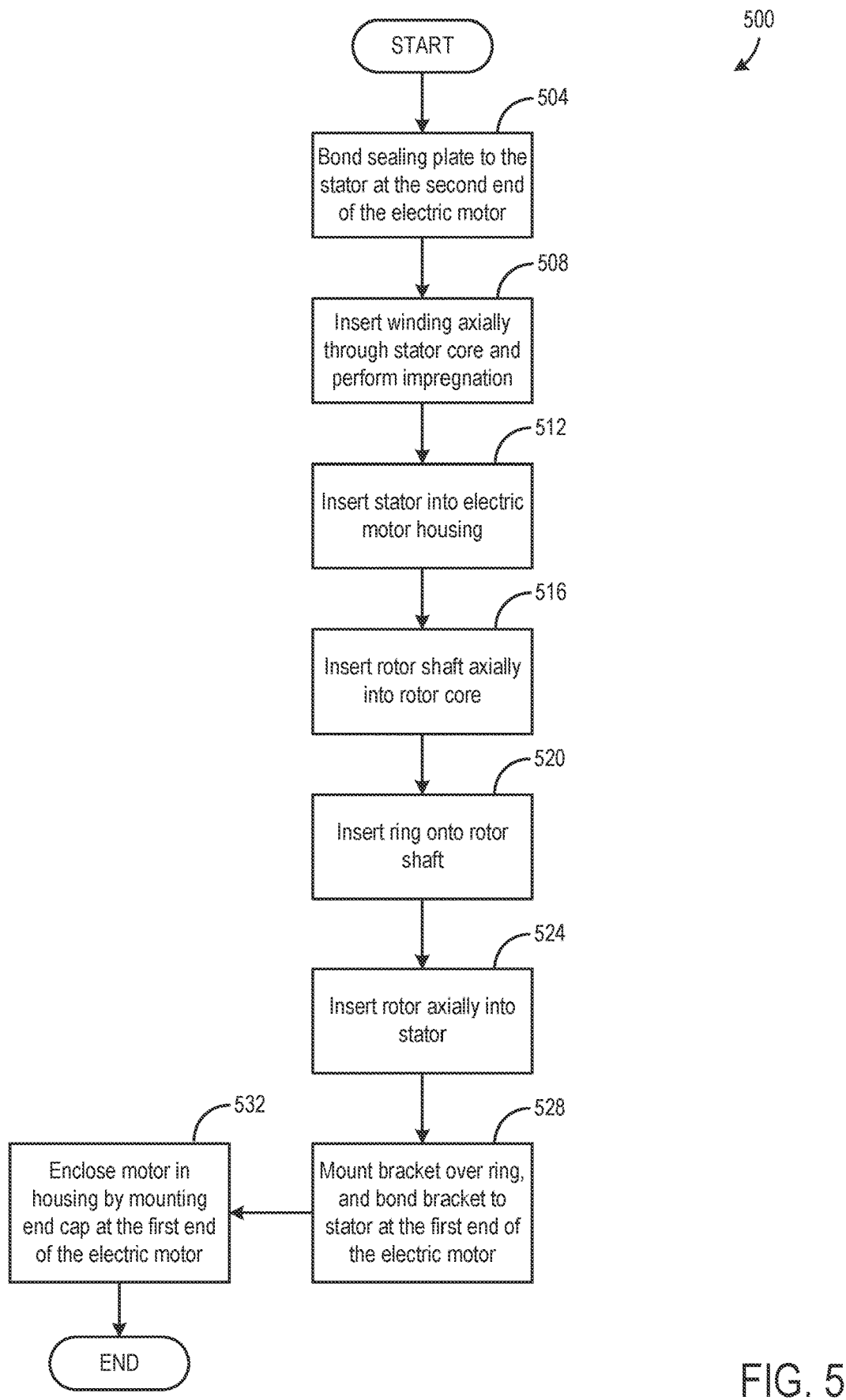
FIG. 5 illustrates an example method for assembling the electric motor 100 of FIGS. 1-2.

FIG. 5 illustrates an example method 500 for assembling an electric motor. The example method 500 may be implemented for the electric motor 100 of FIGS. 1-2, and components contained therein.

At 504, the sealing plate 211 may be bonded to the stator 104 at the second end 203 of the electric motor 100. In one example, the sealing plate 211 may be bonded to the stator 104 at the second end 203 of the electric motor 100 via overmolding.

At 508, the winding (with a corresponding first end winding 106 and a second end 201 winding) may be inserted into the core of stator 104, whereupon being inserted into the stator 104, may be impregnated in order to provide electrical insulation between windings, and reduce vibration.

At 512, the stator 104 may be inserted into an interior envelope of housing 102, the housing 102 including the second end cap 206 but not including the first end cap 207, forming a coaxial assembly aligned along axis 118. Upon insertion into housing 102, the stator 104 may be bonded to housing via welding.

At 516, the rotor shaft 116 may be inserted into an envelope formed by the rotor core 114, forming the rotor 112 aligned along axis 118. The extent of insertion of rotor shaft 116 into the envelope formed by the rotor core 114 is such that the rotor shaft will align properly with the rotor back bearing 218 and the rotor front bearing 209. The rotor shaft 116 may then be bonded to the rotor core 114.

At 520, the ring 213 may be inserted onto rotor shaft 116. In some embodiments, the ring 213 may be in face-sharing contact with the rotor shaft 116 via one or more of an inner circumference (such as inner circumferential surface 406 of FIG. 4) and an inner circumference (such as inner circumference 408 of FIG. 4) of the first dynamic seal 215. However, in another embodiment (such as third example embodiment 375 of FIG. 3C), the ring 213 may not be in contact with the rotor shaft 116, and may be directly bonded to each of the stator 104 and the first balancing plate 120 at the first end 202 of the electric motor 100.

At 524, the rotor 112, including each of the rotor shaft 116, the rotor core 114, the first balancing plate 120, the second balancing plate 204, and the ring 213 including the first dynamic seal 215 in face sharing contact with the rotor shaft 116, may be inserted axially into an envelope of the stator 104, forming a coaxial assembly aligned along axis 118 and introducing the radial air gap 250 between the rotor 112 and the stator 104. The rotor shaft 116 may be inserted into the second end cap 206 at the second end 203 of the electric motor 100, such that the rotor shaft 116 is circumferentially in contact with the rotor back bearing 218.

At 528, the bracket 217 may be mounted over the ring 213, such that the bracket 217 is in face-sharing contact with the first side of the ring 213, and the bracket 217 is also in contact with the stator 104 at the first end 202 of the electric motor 100. Upon mounting bracket 217, the bracket 217 may be bonded to each of the ring 213 at the point of contact of the ring 213 and the bracket 217, and the stator 104 at the point of contact of the bracket 217 and the stator 104 at the first end 202 of the electric motor 100.

At 532, the electric motor 100 may be sealed within housing 102 by mounting first end cap 207 to the housing 102 at the first end 202 of the electric motor 100, enclosing components of the electric motor 100 within a cavity 270. Upon mounting the first end cap 207 on the housing 102, the first end cap 207 may be bonded to the rest of the housing, and method 500 may end.

In this way, by utilizing a ring and sealing plate in conjunction with a scavenge pump in order to remove excess coolant oil out of the radial air gap between the rotor and the stator, oil may remain in the radial air gap without flooding the radial air gap. The technical effect of removing excess coolant oil is to reduce fluid drag on the rotor, which may be generated through fluid flow of the coolant oil due to shearing forces created by motion of the rotor relative to the stator. Additionally, due to the vacuum generated in the radial air gap by the scavenge pump, excess air within the radial air gap may also be removed, reducing winding losses. Sealing off the radial air gap may reduce fluid drag, but may be difficult and expensive. In this system, an amount of oil within the radial air gap may be accepted, leading to some extra cooling, but the oil may be removed sufficiently quickly in order to prevent significant drag losses.

The disclosure provides support for a system, comprising: a ring covering a radial air gap between a stator and a rotor, the ring configured to route coolant out of the radial air gap via one or more channels. In a first example of the system, the system further comprises: one or more brackets coupled to the stator, the one or more brackets overhanging the radial air gap, and wherein the ring is coupled to the one or more brackets at one or more locations. In a second example of the system, optionally including the first example, the system further comprises: a scavenge pump fluidly coupled to the one or more channels, the scavenge pump configured to remove coolant from the radial air gap via the one or more channels. In a third example of the system, optionally including one or both of the first and second examples, the ring includes a plurality of intake holes evenly distributed along a circumference of the ring, the intake holes penetrating from a first side of the ring to a second side of the ring. In a fourth example of the system, optionally including one or more or each of the first through third examples, the one or more channels include a first plurality of fluid lines, wherein each fluid line of the first plurality of fluid lines is coupled to at least one corresponding intake hole of the plurality of intake holes. In a fifth example of the system, optionally including one or more or each of the first through fourth examples, the ring is mechanically coupled to each of the stator and a first balancing plate of the rotor. In a sixth example of the system, optionally including one or more or each of the first through fifth examples, the system further comprises: a sealing plate coupled to the stator at a second end of an electric motor, the sealing plate covering the radial air gap between the rotor and the stator at the second end of the electric motor and channeling flow of coolant between the radial air gap and the one or more channels fluidly coupled to the scavenge pump. In a seventh example of the system, optionally including one or more or each of the first through sixth examples, the stator and the rotor are included within a housing of the electric motor, and wherein the ring covers the radial air gap at a first end of the electric motor, and the sealing plate covers the radial air gap at the second end of the electric motor. In an eighth example of the system, optionally including one or more or each of the first through seventh examples, the system further comprises: a rotor shaft of the rotor of the electric motor passing through a central opening of the ring at the first end of the electric motor, and the rotor shaft passing through another central opening of the sealing plate at the second end of the electric motor. In a ninth example of the system, optionally including one or more or each of the first through eighth examples, the one or more channels include one or more internal channels passing through the rotor shaft, wherein the one or more internal channels of the rotor shaft are fluidly coupled to the scavenge pump.

The disclosure also provides support for a system for an electric motor, comprising: a ring covering a radial air gap between a stator and a rotor at a first end of the electric motor, the ring including a plurality of circular intake hole cutouts, a sealing plate covering the radial air gap at a second end of the electric motor, the sealing plate including another plurality of circular intake hole cutouts, and a scavenge pump coupled to each of the ring and the sealing plate to remove coolant. In a first example of the system, the radial air gap is fluidly coupled to a first conduit formed between the ring and a first balancing plate of the rotor at the first end of the electric motor, the first conduit fluidly coupling the ring to a first plurality of fluid lines via each of the plurality of circular intake hole cutouts. In a second example of the system, optionally including the first example, the radial air gap is fluidly coupled to a second conduit formed between the sealing plate and a second balancing plate of the rotor at the second end of the electric motor, the second conduit fluidly coupling the ring to a second plurality of fluid lines via each of the other plurality of circular intake hole cutouts. In a third example of the system, optionally including one or both of the first and second examples, the ring is coupled to the scavenge pump by the first plurality of fluid lines, and wherein the sealing plate is coupled to the scavenge pump by the second plurality of fluid lines. In a fourth example of the system, optionally including one or more or each of the first through third examples, the ring is positioned within a circumferential bracket coupled to the stator, the system further comprising a rotor shaft of the rotor of the electric motor passing through a central opening of the ring at the first end of the electric motor, and the rotor shaft passing through another central opening of the sealing plate at the second end of the electric motor. In a fifth example of the system, optionally including one or more or each of the first through fourth examples, the system further comprises: a reservoir for storing coolant removed from the radial air gap coupled to the scavenge pump by a third fluid line, and a filter coupled to the reservoir. In a sixth example of the system, optionally including one or more or each of the first through fifth examples, the system further comprises: a controller including instructions that when executed, cause the controller to: operate the scavenge pump to pump air and coolant from the radial air gap between the rotor and the stator via each of the first plurality of fluid lines and the second plurality of fluid lines, the coolant being collected at the reservoir via the third fluid line, a pumping strength of the scavenge pump based on one or more of a speed of the electric motor, temperature of coolant in the radial air gap between the rotor and the stator, and flow rate of coolant through the radial air gap between the rotor and the stator.

The disclosure also provides support for a method for an electric motor assembly, comprising: during circulation of coolant via a stator and a rotor of an electric motor, activating a scavenge pump fluidly coupled to a radial air gap encapsulated by each of a ring and a sealing plate, to remove coolant from the radial air gap between the stator and the rotor via fluid channels housed within an interior of a rotor shaft. In a first example of the method, the radial air gap is fluidly coupled to each of a first conduit formed between the ring and a first balancing plate of the rotor, and a second conduit formed between the sealing plate and a second balancing plate of the rotor, and wherein coolant is routed from the radial air gap via each of the first conduit and the second conduit to a reservoir by the scavenge pump, the coolant flowing from each of the first conduit and the second conduit to the reservoir via the fluid channels housed within the interior of a rotor shaft. In a second example of the method, optionally including the first example, the scavenge pump is operated based on one or more of a speed of the electric motor assembly, a temperature of coolant in the radial air gap between the rotor and the stator, and a flow rate of coolant in the radial air gap between the rotor and the stator, and wherein the coolant flowing to the reservoir is filtered and then circulated through the electric motor assembly via a cooling system pump.

It will be appreciated that the configurations herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a ring covering a radial air gap between a stator and a rotor, the ring configured to route coolant out of the radial air gap via one or more channels; and
a rotor shaft of the rotor of the electric motor passing through a central opening of the ring at the first end of the electric motor, and the rotor shaft passing through another central opening of the sealing plate at the second end of the electric motor.

2. The system of claim 1, further comprising one or more brackets coupled to the stator, the one or more brackets overhanging the radial air gap, and wherein the ring is coupled to the one or more brackets at one or more locations.

3. The system of claim 1, further comprising a scavenge pump fluidly coupled to the one or more channels, the scavenge pump configured to remove coolant from the radial air gap via the one or more channels.

4. The system of claim 3, wherein the ring includes a plurality of intake holes evenly distributed along a circumference of the ring, the intake holes penetrating from a first side of the ring to a second side of the ring.

5. The system of claim 4, wherein the one or more channels include a first plurality of fluid lines, wherein each fluid line of the first plurality of fluid lines is coupled to at least one corresponding intake hole of the plurality of intake holes.

6. The system of claim 5, wherein the ring is mechanically coupled to each of the stator and a first balancing plate of the rotor.

7. The system of claim 3, further comprising a sealing plate coupled to the stator at a second end of an electric motor, the sealing plate covering the radial air gap between the rotor and the stator at the second end of the electric motor and channeling flow of coolant between the radial air gap and the one or more channels fluidly coupled to the scavenge pump.

8. The system of claim 7, wherein the stator and the rotor are included within a housing of the electric motor, and wherein the ring covers the radial air gap at a first end of the electric motor, and the sealing plate covers the radial air gap at the second end of the electric motor.

9. The system of claim 1, wherein the one or more channels include one or more internal channels passing through the rotor shaft, wherein the one or more internal channels of the rotor shaft are fluidly coupled to the scavenge pump.

10. A system for an electric motor, comprising:
a ring covering a radial air gap between a stator and a rotor at a first end of the electric motor, the ring including a plurality of circular intake hole cutouts;
a sealing plate covering the radial air gap at a second end of the electric motor, the sealing plate including another plurality of circular intake hole cutouts; and
a scavenge pump coupled to each of the ring and the sealing plate to remove coolant, wherein the radial air gap is fluidly coupled to a first conduit formed between the ring and a first balancing plate of the rotor at the first end of the electric motor, the first conduit fluidly coupling the ring to a first plurality of fluid lines via each of the plurality of circular intake hole cutouts.

11. The system of claim 10, wherein the radial air gap is fluidly coupled to a second conduit formed between the sealing plate and a second balancing plate of the rotor at the second end of the electric motor, the second conduit fluidly coupling the ring to a second plurality of fluid lines via each of the other plurality of circular intake hole cutouts.

12. The system of claim 11, wherein the ring is coupled to the scavenge pump by the first plurality of fluid lines, and wherein the sealing plate is coupled to the scavenge pump by the second plurality of fluid lines.

13. The system of claim 12, further comprising a reservoir for storing coolant removed from the radial air gap coupled to the scavenge pump by a third fluid line, and a filter coupled to the reservoir.

14. The system of claim 13, further comprising, a controller including instructions that when executed, cause the controller to:

operate the scavenge pump to pump air and coolant from the radial air gap between the rotor and the stator via each of the first plurality of fluid lines and the second plurality of fluid lines, the coolant being collected at the reservoir via the third fluid line, a pumping strength of the scavenge pump based on one or more of a speed of the electric motor, temperature of coolant in the radial air gap between the rotor and the stator, and flow rate of coolant through the radial air gap between the rotor and the stator.

15. The system of claim 10, wherein the ring is positioned within a circumferential bracket coupled to the stator, the system further comprising a rotor shaft of the rotor of the electric motor passing through a central opening of the ring at the first end of the electric motor, and the rotor shaft passing through another central opening of the sealing plate at the second end of the electric motor.

16. A method for an electric motor assembly, comprising:

during circulation of coolant via a stator and a rotor of an electric motor, activating a scavenge pump fluidly coupled to a radial air gap encapsulated by each of a ring and a sealing plate, to remove coolant from the radial air gap between the stator and the rotor via fluid channels housed within an interior of a rotor shaft, wherein the radial air gap is fluidly coupled to each of a first conduit formed between the ring and a first balancing plate of the rotor, and a second conduit formed between the sealing plate and a second balancing plate of the rotor, and wherein coolant is routed from the radial air gap via each of the first conduit and the second conduit to a reservoir by the scavenge pump, the coolant flowing from each of the first conduit and the second conduit to the reservoir via the fluid channels housed within the interior of the rotor shaft.

17. The method of claim 16, wherein the scavenge pump is operated based on one or more of a speed of the electric motor assembly, a temperature of coolant in the radial air gap between the rotor and the stator, and a flow rate of coolant in the radial air gap between the rotor and the stator, and wherein the coolant flowing to the reservoir is filtered and then circulated through the electric motor assembly via a cooling system pump.

\* \* \* \* \*